United States Patent
Martinez Stone et al.

(10) Patent No.: US 12,321,434 B2
(45) Date of Patent: Jun. 3, 2025

(54) ACCOUNT AUTHENTICATION USING HANDWRITING SAMPLES

(71) Applicant: Capital One Services, LLC, McLean, VA (US)

(72) Inventors: Armando Martinez Stone, Arlington, VA (US); Tyler Maiman, Melville, NY (US); Samuel Rapowitz, Roswell, GA (US)

(73) Assignee: Capital One Services, LLC, McLean, VA (US)

( * ) Notice: Subject to any disclaimer, the term of this patent is extended or adjusted under 35 U.S.C. 154(b) by 266 days.

(21) Appl. No.: 18/308,919

(22) Filed: Apr. 28, 2023

(65) Prior Publication Data

US 2024/0362308 A1 Oct. 31, 2024

(51) Int. Cl.
*G06F 21/00* (2013.01)
*G06F 21/32* (2013.01)
*G06V 40/30* (2022.01)

(52) U.S. Cl.
CPC .............. *G06F 21/32* (2013.01); *G06V 40/30* (2022.01)

(58) Field of Classification Search
None
See application file for complete search history.

(56) References Cited

U.S. PATENT DOCUMENTS

| | | | |
|---|---|---|---|
| 10,133,859 B2 | 11/2018 | Song et al. | |
| 11,574,357 B1 * | 2/2023 | Rugel | G06F 21/32 |
| 12,014,369 B2 * | 6/2024 | Giobbi | H04L 63/0861 |
| 2020/0349245 A1 * | 11/2020 | Shila | G07C 9/257 |
| 2020/0364721 A1 * | 11/2020 | Pickering | G06Q 20/3825 |
| 2021/0397683 A1 * | 12/2021 | Liem | H04L 67/535 |
| 2022/0405363 A1 * | 12/2022 | Williams | G06F 18/2321 |

(Continued)

OTHER PUBLICATIONS

Soelistio, Elizabeth Ann et al. A Review of Signature Recognition Using Machine Learning. 2021 1st International Conference on Computer Science and Artificial Intelligence (ICCSAI). https://ieeexplore.ieee.org/stamp/stamp.jsp?tp=&arnumber=9609732 (Year: 2021).*

(Continued)

*Primary Examiner* — Jeremiah L Avery
(74) *Attorney, Agent, or Firm* — Harrity & Harrity, LLP

(57) ABSTRACT

In some implementations, a device may obtain registration information, associated with an account, including one or more training handwriting samples of a user. The device may detect an initiation of an event associated with the account. The device may provide, to a terminal device associated with the event, the one or more authentication prompts to cause the terminal device to provide the one or more authentication prompts while the event is pending. The device may obtain, from the terminal device, one or more handwriting samples in response to the one or more authentication prompts. The device may determine, using a machine learning model, whether the user is associated with the event based on whether the one or more handwriting samples are in a handwriting of the user. The device may authenticate the event based on determining whether the one or more handwriting samples are in the handwriting of the user.

20 Claims, 7 Drawing Sheets

(56) References Cited

U.S. PATENT DOCUMENTS

| | | | | |
|---|---|---|---|---|
| 2023/0138176 A1* | 5/2023 | Soryal | G06F 21/32 |
| | | | 726/7 |
| 2023/0244769 A1* | 8/2023 | Wallach | G06V 40/172 |
| | | | 726/2 |
| 2023/0367854 A1* | 11/2023 | Mukherjee | G06N 3/08 |
| 2024/0061915 A1* | 2/2024 | Liu | G06F 21/32 |
| 2024/0232308 A1* | 7/2024 | Beaver | G10L 17/04 |

OTHER PUBLICATIONS

Sheikh, Muhammad Rafsun et al. An Efficient Transfer Learning Model for Predicting Forged (Handwritten) Signature. 2021 International Conference on Computer, Communication, Chemical, Materials and Electronic Engineering (IC4ME2). https://ieeexplore.ieee.org/stamp/stamp.jsp?tp=&arnumber=9768440 (Year: 2021).*

Heinen, Milton Roberto; Osorio, Fernando Santos. Handwritten Signature Authentication using Artificial Neural Networks. The 2006 IEEE International Joint Conference on Neural Network Proceedings. https://ieeexplore.ieee.org/stamp/stamp.jsp?tp=&arnumber=1716797 (Year: 2006).*

* cited by examiner

ACCOUNT AUTHENTICATION USING HANDWRITING SAMPLES

BACKGROUND

Handwriting analysis for authentication, also known as handwriting biometrics or signature verification, is a technique used to verify the authenticity of a handwritten signature or document. The process involves analyzing the characteristics of the handwriting to determine whether it matches a known signature or document. Handwriting analysis is based on the idea that every person has a unique handwriting style, which is determined by a combination of physical and behavioral factors. These factors include muscle control, hand-eye coordination, writing speed, pressure, and the shape and size of letters and other writing elements. Computerized analysis of handwriting involves using software to scan and analyze the handwriting samples to identify patterns and/or features that can be used to determine whether the samples match. Some devices use machine learning algorithms to identify the patterns and/or the features in the handwriting and improve the accuracy of the handwriting analysis.

SUMMARY

Some implementations described herein relate to a system for account authentication using handwriting samples. The system may include one or more memories and one or more processors communicatively coupled to the one or more memories. The one or more processors may be configured to obtain registration information associated with an account, the registration information including one or more training handwriting samples of a user associated with the account, wherein the one or more training handwriting samples are associated with training a machine learning model to recognize a handwriting of the user. The one or more processors may be configured to detect an initiation of an event associated with the account and a terminal device. The one or more processors may be configured to generate, in response to detecting the initiation of the event, a random sequence of one or more authentication prompts associated with authenticating that the user is associated with the event. The one or more processors may be configured to provide, to the terminal device and in response to detecting the initiation of the event, an indication of the one or more authentication prompts to cause the terminal device to provide the one or more authentication prompts in connection with performing the event. The one or more processors may be configured to obtain, from the terminal device, one or more handwriting samples corresponding to the one or more authentication prompts. The one or more processors may be configured to determine, using the machine learning model, whether the user is associated with the event based on verifying that the one or more handwriting samples are associated with the handwriting of the user. The one or more processors may be configured to perform an action associated with enabling or preventing a completion of the event based on whether the user is associated with the event.

Some implementations described herein relate to a method of account authentication using handwriting samples. The method may include obtaining, by a device, registration information associated with an account, the registration information including one or more training handwriting samples of a user associated with the account. The method may include detecting, by the device, an initiation of an event associated with the account. The method may include providing, by the device and to a terminal device associated with the event, an indication of one or more authentication prompts to cause the terminal device to provide the one or more authentication prompts while the event is pending, wherein the one or more authentication prompts are randomly selected. The method may include obtaining, by the device and from the terminal device, one or more handwriting samples in response to the one or more authentication prompts. The method may include determining, by the device and using a machine learning model, whether the user is associated with the event based on determining whether the one or more handwriting samples are in a handwriting of the user. The method may include authenticating, by the device, the event based on determining whether the one or more handwriting samples are in the handwriting of the user.

Some implementations described herein relate to a non-transitory computer-readable medium that stores a set of instructions. The set of instructions, when executed by one or more processors of a device, may cause the device to provide, to a backend device, an indication of an event associated with an account. The set of instructions, when executed by one or more processors of the device, may cause the device to obtain, from the backend device, an indication to collect one or more handwriting samples using one or more authentication prompts in response to providing the indication of the event. The set of instructions, when executed by one or more processors of the device, may cause the device to provide the one or more authentication prompts for display. The set of instructions, when executed by one or more processors of the device, may cause the device to obtain one or more handwriting samples based on providing the one or more authentication prompts for display. The set of instructions, when executed by one or more processors of the device, may cause the device to provide, to the backend device, an indication of the one or more handwriting samples. The set of instructions, when executed by one or more processors of the device, may cause the device to obtain, from the backend device, an indication of whether the event is approved or denied in response to providing the indication of the one or more handwriting samples.

DETAILED DESCRIPTION

Figure 1A:
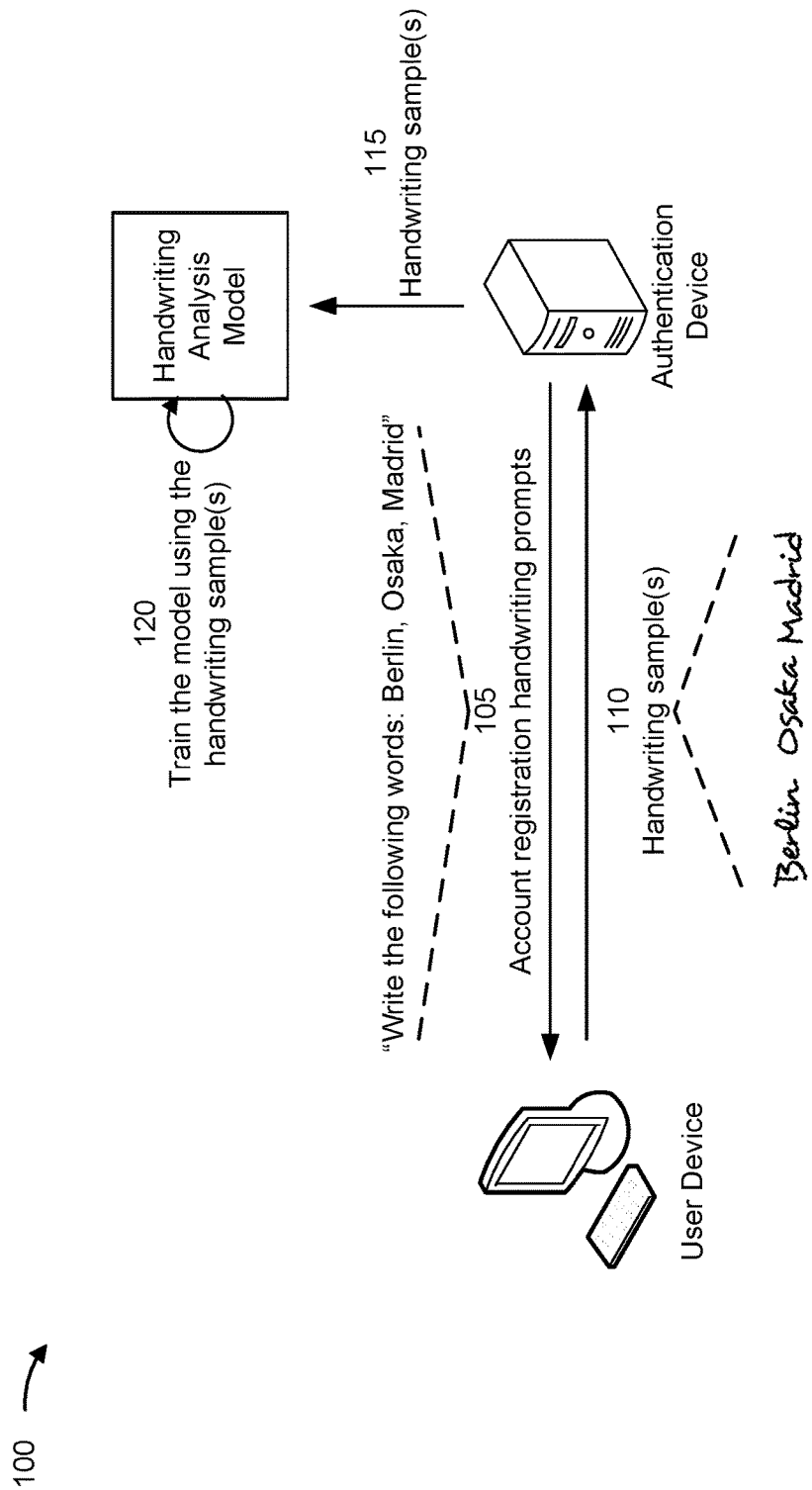
FIGS. 1A-1C are diagrams of an example associated with account authentication using handwriting samples, in accordance with some embodiments of the present disclosure.

The following detailed description of example implementations refers to the accompanying drawings. The same reference numbers in different drawings may identify the same or similar elements.

Handwritten signatures (e.g., a signature of a name of a person) are used as a means of authenticating a person. For example, a person may sign their signature on a document as a means of authenticating that the person approved, agreed to, or is otherwise aware of the document. As another example, a person may sign their signature to approve an action or operation associated with an account. However, there are several problems associated with using handwritten signatures to authenticate a person and/or an account.

For example, there is a lack of standardization of handwritten signatures. Handwritten signatures can vary widely in appearance, making it difficult to establish a standard for comparison. This can lead to errors by a device in verification and increase the risk of false positives or false negatives when the device is authenticating a person and/or an account. Additionally, handwritten signatures are susceptible to forgery. Handwritten signatures can be easily copied or forged, especially with the availability of advanced technologies like scanners and printers. This makes it difficult for a device analyzing the signature to ensure that a signature is authentic and has not been tampered with. As a result, the device may mistakenly authenticate or approve an operation associated with the person or the account (e.g., that is initiated by a malicious actor who has forged the signature of the person), thereby consuming processing resources, network resources, and/or memory resources, among other examples, associated with performing the operation. Further, this introduces a significant security risk for accounts protected via handwritten signature authentication.

In some cases, alternative means of authentication, such as biometric authentication or digital signatures, may be used to authenticate the person and/or the account. However, the alternative means may require additional and/or expensive components, such as biometric scanners, and/or devices capable of generating or capturing digital signatures, among other examples, that may not be available in all scenarios. In such examples, a handwritten input may be needed to authenticate the person and/or the account. However, it may be difficult for a device to recognize a handwriting of the person (e.g., the device may be capable of recognizing the signature of the person because this is expected to be specific to the person). Moreover, providing another written input (e.g., a word, a phrase, and/or a drawing) that is different than the signature may present similar problems as a handwritten signature if the same, or a small number of, written inputs are provided each time the person attempts to authenticate themselves and/or an account (e.g., a malicious actor may be able to easily forge or imitate a written input if the same written input is always used to authenticate the person and/or the account). However, it may be difficult to coordinate (e.g., between a device performing the authentication and/or analyzing a handwriting of the user and a device collecting the handwritten input) which written input is to be provided by the person (e.g., in real time when authentication is requested). Further, it may be difficult to ensure that the written input has enough unique features to enable the device performing the authentication to reliably determine whether the written input is in the handwriting of the person.

Some implementations described herein enable account authentication using handwriting samples. For example, an authentication device may obtain registration information associated with an account (e.g., registration information for establishing, generating, and/or modifying the account). The registration information may include one or more training handwriting samples of a user associated with the account. For example, the registration information may include handwriting samples to be used to train a machine learning model to recognize a handwriting of the user. The authentication device may provide the handwriting samples to the machine learning model (or to a device that trains the machine learning model) to train a machine learning model to recognize the handwriting of the user. Obtaining the handwriting samples as part of a registration procedure for the account ensures that the authentication device is configured to recognize and/or analyze the handwriting of the user (e.g., an owner of the account) for all events and/or interactions associated with the account. This improves the security of the account by enabling the authentication device to perform improved authentication using handwriting analysis of random authentication prompts, as described in more detail elsewhere herein.

For example, the authentication device may detect an initiation of an event associated with the account. The event may be any interaction, access attempt, or exchange, among other examples associated with the account. In some implementations, the authentication device may detect that a fraud score (e.g., a score indicating a likelihood of fraud) associated with the event satisfies a fraud threshold. The authentication device may determine that handwriting analysis is to be used to authenticate or verify the event associated with the account (e.g., to authenticate that the user associated with the account has initiated the event, rather than a malicious actor), such as based on the fraud score satisfying the fraud threshold.

In some implementations, the authentication device may generate, in response to detecting the event, a random sequence of one or more authentication prompts associated with authenticating that the user is associated with the event. The authentication prompts may be words, phrases, letters, punctuation, and/or shapes, among other examples, to be written and provided as handwriting samples to be used to authenticate that the user is associated with the event. By generating a random sequence of authentication prompts (e.g., by randomly selecting the authentication prompts), the authentication device may reduce a likelihood that a malicious actor is able to learn, imitate, or otherwise forge the handwriting of the user (e.g., because it may be difficult to predict the authentication prompts that will be provided for authenticating a given event). In some implementations, the authentication device may generate authentication prompts based on a level of complexity (e.g., a metric indicating a complexity of the authentication prompt) of the one or more authentication prompts satisfying a complexity threshold. This ensures that the handwriting samples collected by the authentication device to authenticate that the user is associated with the event are unique and/or complex enough (e.g., provide a sufficient level of data points) to enable the authentication device (e.g., the trained machine learning model) to reliably determine whether the handwriting samples are in the handwriting of the user.

The authentication device may provide, to a terminal device, an indication of the one or more authentication prompts. The terminal device may be a device at which the event was initiated. The authentication device may obtain, from the terminal device, an indication of one or more handwriting samples corresponding to the one or more authentication prompts. For example, the one or more handwriting samples may be handwritten responses to the one or more authentication prompts. As used herein, "handwritten" may refer to an input that is written by a user using an implement, such as a pen, a pencil, a stylus, a finger, and/or any other implement. In other words, the one or more handwriting samples may be provided via physical handwriting samples (e.g., via pen or pencil and paper) or digital handwriting samples (e.g., input via a user interface or display screen), among other examples.

The authentication device may determine, using the trained machine learning model, whether the user is associated with the event based on verifying or authenticating that the one or more handwriting samples are associated with the handwriting of the user. The authentication device may perform an action associated with enabling or preventing a completion of the event based on whether the user is associated with the event. In other words, the authentication device may authenticate, using handwriting analysis, whether the user is associated with the event in real time before the event is completed. This improves the security of the account by enabling the authentication device to reliably determine whether the event is fraudulent or associated with a malicious actor (e.g., via the authentication device performing handwriting analysis with improved reliability using randomly generated authentication prompts as described elsewhere herein). This conserves processing resources, network resources, and/or memory resources, among other examples, that would have otherwise been used to complete the event, identify that the event is fraudulent and/or associated with a malicious actor, and/or perform corrective actions to remedy the fraudulent event, among other examples.

Figure 1B:
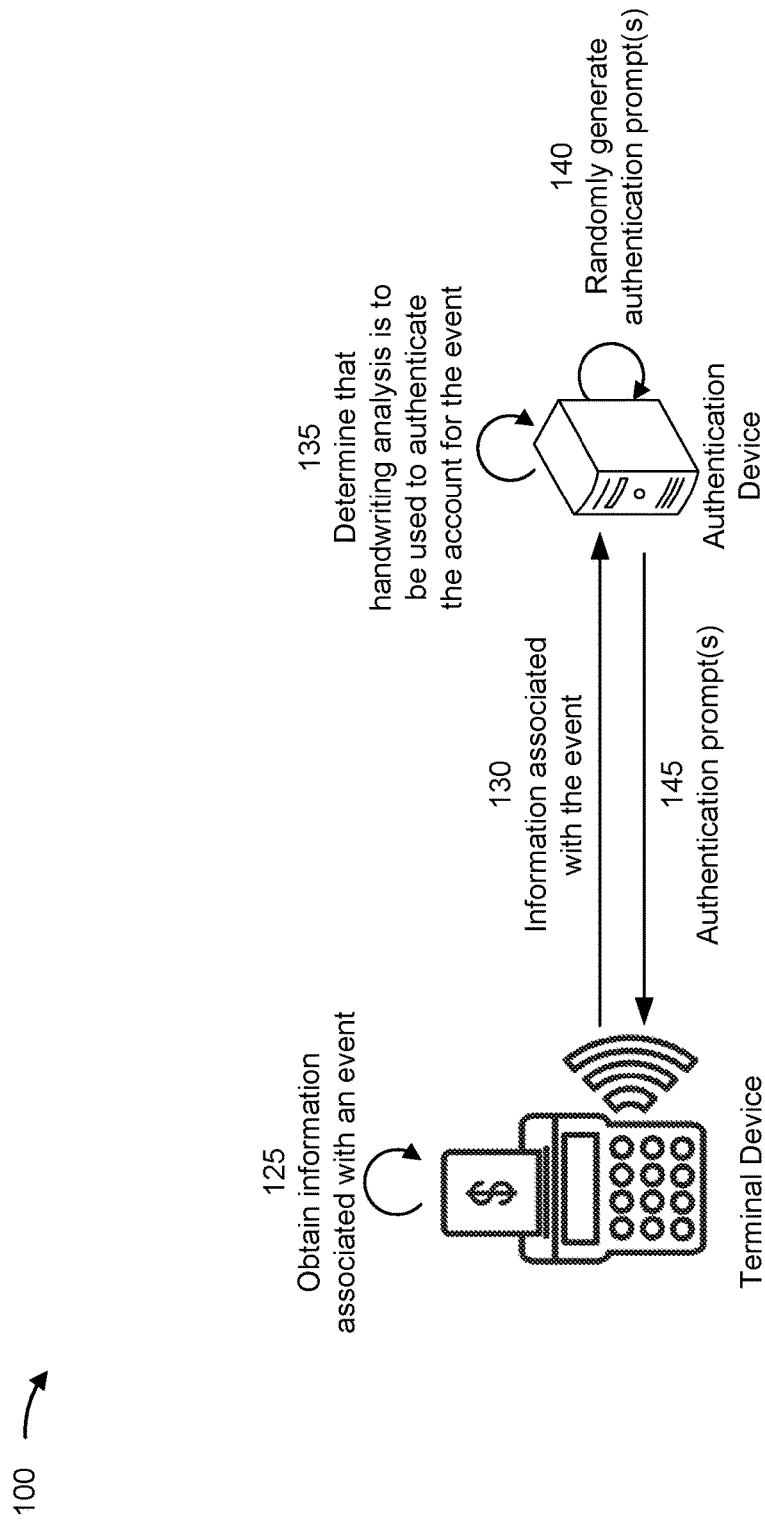
Figure 1C:
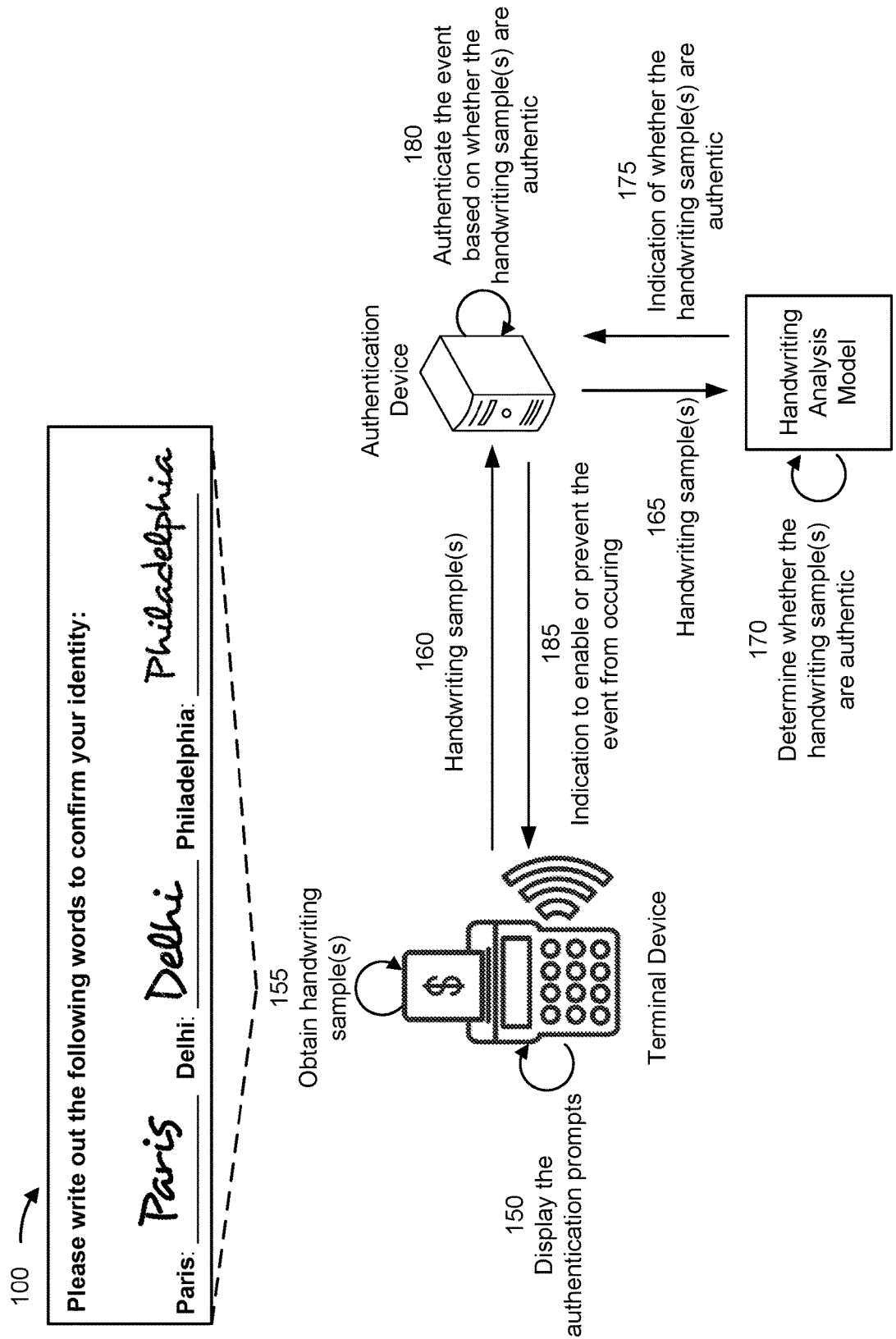

FIGS. 1A-1C are diagrams of an example 100 associated with account authentication using handwriting samples. As shown in FIGS. 1A-1C, example 100 includes a user device, an authentication device, and a terminal device, among other examples. These devices are described in more detail in connection with FIGS. 2 and 3.

The user device may be associated with a user. For example, the user may utilize the user device to register for, or access information related to, an account. The account may be associated with an entity or institution. For example, the account may be a transaction account, a credit account, a bank account, a social media account, an email account, a utility account (e.g., an account with a utility provider), and/or another type of account. The user may utilize the user device to perform a registration procedure associated with the account. The registration procedure may be associated with establishing the account. As another example, the registration procedure may be associated with updating or modifying information (e.g., account information, such as adding or removing authorized users, and/or changing contact information) for an established account. As another example, the registration procedure may be associated with opting in to handwriting-based authentication (e.g., enrolling the account for handwriting-based authentication), as described herein. For example, the user may opt in to and/or request that the authentication device authenticate the account and/or events associated with the account using handwriting analysis, as described in more detail elsewhere herein. The registration procedure may be associated with requesting that the handwriting-based authentication be performed and/or activated for the account.

As shown in FIG. 1A, and by reference number 105, the authentication device may provide, and the user device may obtain, one or more account registration handwriting prompts. The one or more account registration handwriting prompts may have prompts provided to obtain handwriting samples of the user as part of the registration procedure. For example, the one or more account registration handwriting prompts may be one or more words, phrases, shapes, numbers, punctuation, and/or objects, among other examples, that are to be reproduced by the user in the handwriting of the user. For example, as shown in FIG. 1A, the one or more account registration handwriting prompts may be "Write the following words: Berlin, Osaka, Madrid." In such examples, the one or more account registration handwriting prompts may prompt the user to hand write the words Berlin, Osaka, and Madrid, and provide the handwritten words as a handwriting sample of the user.

The authentication device may determine the one or more account registration handwriting prompts. In some implementations, the authentication device may determine the one or more account registration handwriting prompts based on information associated with a machine learning model to be used to analyze the handwriting of the user (e.g., shown in FIG. 1A as a handwriting analysis model). For example, the information may include prompts (e.g., words, phrases, shapes, numbers, punctuation, and/or objects) that are used to train the handwriting analysis model. For example, the one or more account registration handwriting prompts may be associated with a level of complexity that is needed to enable the handwriting analysis model to be trained to recognize or identify the handwriting of a given person (e.g., the user). The level of complexity may be based on one or more factors, such as a number of letters, a given combination of letters (e.g., certain combinations of letters having connections associated with a greater level of complexity), a number of strokes associated with writing the prompt, a number of curves included in the prompt, a number of angles included in the prompt, and/or a number of connections between letters or shapes in the prompt, among other examples. In some implementations, the level of complexity may be indicated by a number of data points that can be extracted from a handwriting sample of the prompt. In some implementations, the level of complexity may be indicated by a number of minutiae points included in the prompt.

The authentication device may determine the one or more account registration handwriting prompts based on a level of complexity of the one or more account registration handwriting prompts satisfying a training complexity threshold. The training complexity threshold may be a level of complexity of a prompt that provides sufficient data points to enable the handwriting analysis model to be trained to recognize and/or identify the handwriting of a given person (e.g., the user).

The user device may display or output (e.g., via a display screen and/or a speaker) an indication of the one or more account registration handwriting prompts. For example, in response to obtaining the one or more account registration handwriting prompts, the user device may display the indication of the one or more account registration handwriting prompts to cause the user to provide handwriting samples corresponding to the one or more account registration handwriting prompts. The user device may obtain one or more training handwriting samples of the user associated with the account. For example, the one or more training handwriting samples may be indicated via one or more images obtained and/or captured by the user device (e.g., one or more images of the one or more training handwriting samples may be uploaded and/or obtained by the user device). As another example, the one or more training handwriting samples may be input to the user device (e.g., via a touch screen or a signature capture pad). For example, the user device may include a pressure-sensitive surface that captures the motion and pressure of a pen, stylus, or finger as a user writes on the pressure-sensitive surface. The user device may obtain the one or more training handwriting samples via an input to the pressure-sensitive surface.

As another example, the user device may use augmented reality (AR) or other camera tracking techniques to obtain the one or more training handwriting samples. For example, the user device may include a component (e.g., a camera and/or sensor) that is configured to record and/or capture the user's movements as the user writes on a surface. The user device may analyze the recorded data to identify specific features of the handwriting, such as stroke width, speed, and/or pressure, among other examples. In some implementations, the user device may provide the recorded data to the authentication device (e.g., rather than the user device analyzing the recorded data).

As shown by reference number 110, the user device may provide, and the authentication device may obtain, the one or more training handwriting samples. As described elsewhere herein, the one or more training handwriting samples may be indicated via one or more images, one or more videos, recorded data (e.g., AR data), and/or input to a pressure-sensitive surface, among other examples. The one or more training handwriting samples may be associated with training the handwriting analysis model to recognize the handwriting of the user associated with the account. For example, as shown by reference number 115, the authentication device may provide, and the handwriting analysis model may obtain, the one or more training handwriting samples. In some implementations, the authentication device may provide the one or more training handwriting samples directly to the handwriting analysis model. In other implementations, the authentication device may provide the one or more training handwriting samples to another device associated with training the handwriting analysis model. In other words, the training of the handwriting analysis may be performed by the authentication device or by another device.

As shown by reference number 120, the authentication device and/or another device may train the handwriting analysis model using the one or more training handwriting samples. For example, the handwriting analysis model may be trained to recognize and/or identify the handwriting of the user based on the one or more training handwriting samples and/or other training data. For example, a training device (e.g., the authentication device and/or another device) may collect training data for the handwriting analysis model. The training data may include the one or more training handwriting samples and/or other data, such as handwriting samples of other users to be used to ensure that the handwriting analysis model is able to differentiate between the handwriting of the user and handwriting of other users. The training device may preprocess the training data. For example, the training device may extract relevant features for the handwriting analysis model. The training device may segment the handwriting samples into individual characters or words, normalize the size and orientation of the samples, and/or convert the handwriting into a digital format such as an image or a sequence of pen strokes, among other examples. The training device may extract relevant features from the preprocessed training data (e.g., via edge detection, contour tracing, and/or statistical analysis of stroke patterns). The relevant features may include features that can be used to differentiate between different characters or words, such as stroke shape or direction, line spacing, stroke pressure, stroke width, character shape, character structure, writing implement lifts or pauses (e.g., when the writing implement, such as a pen, is lifted off a writing surface), line slope, line angle, and/or other relevant features. The training device may provide (e.g., feed) the training data and/or relevant features to the handwriting analysis model. The training device may adjust parameters of the handwriting analysis model to minimize the difference between a predicted output of the handwriting analysis model and a label of an input to the handwriting analysis model.

After an evaluation metric of a performance of the handwriting analysis model satisfies a threshold, the handwriting analysis model may be used and/or deployed to recognize the handwriting of the user of the account. The handwriting analysis model may be any suitable machine learning model for performing handwriting analysis. For example, the handwriting analysis model may be a support vector machine (SVM) model, a convolutional neural network (CNN) model, a random forest model, a recurrent neural network (RNN) model, and/or a K-nearest neighbor (KNN) model, among other examples.

As shown in FIG. 1B, and by reference number 125, a terminal device may obtain information associated with an event that is associated with the account. In other examples, another device, such as the user device or a mobile device, may obtain the information associated with an event that is associated with the account in a similar manner as described herein. The event may be any interaction associated with the account. For example, the event may be a transaction or exchange associated with the account. For example, a transaction device associated with the account may be used to initiate a transaction via the terminal device. In such examples, the information associated with the event may include transaction data. As another example, the event may be an access attempt (e.g., a login attempt) associated with the account, a password change request associated with the account, a test to determine whether the event is initiated by a human (e.g., similar to a challenge-response test), and/or a withdrawal (or deposit) request associated with the account (e.g., for funds associated with the account), among other examples.

For example, a user may interact with the terminal device to initiate the event (e.g., by presenting or providing the transaction device and/or by inputting information to the terminal device). The terminal device may collect or obtain the information associated with the event, such as a type or category associated with the event, an account identifier of the account, a date and/or time associated with the event, and/or a location associated with the event, among other examples. As shown by reference number 130, the terminal device may provide, and the authentication device may obtain, the information associated with the event. For example, if the event is a transaction, the terminal device may request approval of the transaction. As another example, if the event is associated with a password change request, the terminal device may request approval of the password change and/or request that the password be changed to a new password (e.g., indicated via an input to the terminal device).

The authentication device may detect the initiation of the event. For example, the authentication device may detect the initiation of the event in response to obtaining the information associated with the event (e.g., from the terminal device). In some implementations, as shown by reference number 135, the authentication device may determine that handwriting analysis is to be used to authenticate the account for the event. In other words, the authentication device may determine that handwriting analysis is to be used to authenticate or verify that the user associated with the account initiated the event.

In some implementations, the authentication device may determine that handwriting analysis is to be used to authenticate the account for the event based on a fraud score associated with the event. The authentication device may determine that handwriting analysis is to be used to authenticate the account for the event based on the fraud score satisfying a fraud threshold (e.g., indicating a high likelihood that the event is associated with fraud). This may improve security by providing enhanced authentication for events associated with a high likelihood of fraud and/or may conserve processing resources that would have otherwise been used to perform the handwriting-based authentication for all events associated with the account.

The fraud score may indicate a likelihood that the event is associated with fraud. For example, the authentication device may determine or generate the fraud score based on the information associated with the account. For example, the authentication device may provide the information associated with the account to a fraud model (e.g., a machine learning model that is trained to output a fraud score based on an input including information associated with a given event). For example, the authentication device may determine, based on one or more parameters associated with the event, a fraud score indicating a likelihood that the event is associated with fraud. The one or more parameters may include the information associated with the event, such as a geographic location of the event, device information associated with the event (e.g., of the terminal device or a transaction device), a history of events associated with the account (e.g., to indicate patterns or anomalies that could indicate fraudulent activity), a user behavior associated with the event (e.g., time spent on a page, the number of attempts to enter login credentials, and/or the number of errors made, among other examples can be used to assess the likelihood of fraud), and/or an IP address associated with the event, among other examples.

Additionally, or alternatively, the authentication device may determine that handwriting analysis is to be used to authenticate the account for the event based on a type or category associated with the event. For example, certain events may be associated with a higher level of security and/or authentication, such as a password change, a withdrawal request, and/or a transaction for an amount greater than a threshold, among other examples. In other implementations, the authentication device may determine that handwriting analysis is to be used to authenticate the account for all events associated with the account.

As shown by reference number 140, the authentication device may randomly generate one or more authentication prompts (e.g., for handwriting-based authentication of the account and/or the event). The authentication prompts may be prompts for handwriting samples to be used to authenticate that the user (e.g., associated with the account) has initiated the event. For example, the authentication prompts may include one or more words, letters, phrases, shapes, numbers, punctuation, and/or objects, among other examples. In some implementations, the authentication device may randomly select the one or more authentication prompts from a set of authentication prompts.

In some implementations, the authentication device may generate, in response to detecting the initiation of the event and/or in response to determining that handwriting-based authentication is to be used, a random sequence of one or more authentication prompts associated with authenticating that the user is associated with the event. The random sequence may include randomly selected and/or randomly ordered authentication prompts. This increases a reliability of the determination of whether the user is associated with the event because using the random sequence may reduce a likelihood that a malicious actor is able to imitate or forge the handwriting of the user in response to the authentication prompts. For example, a malicious actor may be unable to predict what authentication prompts will be provided for handwriting analysis. Therefore, the malicious actor may be unable to learn and/or practice the user's handwriting for the authentication prompts because the malicious actor will not know what prompts will need to be written to authenticate the event.

In some implementations, the authentication device may generate the one or more authentication prompts based on a level of complexity of the one or more authentication prompts satisfying a complexity threshold. For example, as described elsewhere herein, the authentication device may generate authentication prompts that have a level of complexity and/or uniqueness to enable the authentication device and/or the handwriting analysis model to reliably determine whether handwriting samples of the authentication prompts are in the handwriting of the user of the account. In some implementations, the one or more authentication prompts may be different than the one or more account registration handwriting prompts described above.

As shown by reference number 145, the authentication device may provide (e.g., in response to detecting the initiation of the event and/or in response to determining that handwriting-based authentication is to be used), and the terminal device may obtain, an indication of the one or more authentication prompts. For example, the authentication device may provide the indication of the one or more authentication prompts to cause the terminal device to provide the one or more authentication prompts in connection with performing the event. In other words, the authentication device may provide the indication of the one or more authentication prompts to cause the authentication prompts to be provided to a user initiating the event in real-time before the event is completed.

As shown in FIG. 1C, and by reference number 150, the terminal device may provide, display, and/or output the one or more authentication prompts. For example, the terminal device may display, via a display screen or a signature capture pad, the one or more authentication prompts. Additionally, or alternatively, the terminal device may output the one or more authentication prompts via a speaker. In some implementations, the terminal device may print a receipt (e.g., a physical receipt), or may cause the receipt to be printed, that includes the one or more authentication prompts included on the receipt. For example, as shown in FIG. 1C, the one or more authentication prompts may be the words "Paris," "Delhi," and "Philadelphia." The terminal device may display a request for a user to handwrite the authentication prompts (e.g., "Please write out the following words to confirm your identity") and may display one or more fields for the user to handwrite the authentication prompts.

As shown by reference number 155, the terminal device may obtain one or more handwriting samples corresponding to the authentication prompts. For example, the one or more handwriting samples may be indicated via one or more images obtained and/or captured by the terminal device (e.g., one or more images of the one or more handwriting samples may be uploaded and/or obtained by the user device). As another example, the one or more handwriting samples may be input to the terminal device (e.g., via a touch screen or a signature capture pad). For example, the terminal device may include a pressure-sensitive surface that captures the motion and pressure of a pen, stylus, or finger as a user writes on the pressure-sensitive surface. The terminal device may obtain the one or more handwriting samples via an input to the pressure-sensitive surface. As another example, the terminal device may use AR or other camera tracking techniques to obtain the one or more training handwriting samples. For example, the terminal device may include a component (e.g., a camera and/or sensor) that is configured to record and/or capture the user's movements as the user writes on a surface. The terminal device may analyze the recorded data to identify specific features of the handwriting, such as stroke width, speed, and/or pressure, among other examples. In some implementations, the terminal device may provide the recorded data to the authentication device (e.g., rather than the user device analyzing the recorded data).

As shown by reference number 160, the terminal device may provide, and the authentication device may obtain, the one or more handwriting samples corresponding to the one or more authentication prompts. For example, the authentication device may obtain handwritten samples of the one or more authentication prompts. The authentication device may obtain a captured image of a receipt associated with the event, the captured image of the receipt depicting the one or more handwriting samples. As another example, the authentication device may obtain one or more images, data points from a signature input to a capture pad, and/or recorded data (e.g., AR data), among other examples, indicating the one or more handwriting samples.

The authentication device may determine, using the handwriting analysis model, whether the user is associated with the event based on verifying that the one or more handwriting samples are associated with the handwriting of the user. In some implementations, the authentication device may preprocess the one or more handwriting samples prior to providing the one or more handwriting samples to the handwriting analysis model. This may improve an accuracy of the output of the handwriting analysis model. For example, the authentication device may extract relevant features for the handwriting analysis model. The authentication device may segment the handwriting samples into individual characters or words, normalize the size and orientation of the samples, and/or convert the handwriting into a digital format such as an image or a sequence of pen strokes, among other examples. The authentication device may extract relevant features from the preprocessed training data (e.g., via edge detection, contour tracing, and/or statistical analysis of stroke patterns). The relevant features may include features can be used to differentiate between different characters or words, such as stroke shape or direction, line spacing, stroke pressure, stroke width, character shape, character structure, writing implement lifts or pauses (e.g., when the writing implement, such as a pen, is lifted off a writing surface), line slope, line angle, and/or other relevant features.

As shown by reference number 165, the authentication device may provide, as an input to the handwriting analysis model, the one or more handwriting samples (e.g., the preprocessed handwriting sample(s)). As shown by reference number 170, the handwriting analysis model may determine whether the one or more handwriting samples are authentic (e.g., are in the handwriting of the user). For example, the handwriting analysis model may output an indication of whether the one or more handwriting samples are authentic. As an example, the output of the handwriting analysis model may be a confidence score that indicates a likelihood that the one or more handwriting samples are in the handwriting of the user associated with the account (e.g., the owner of the account). For example, the handwriting analysis model may compare the one or more handwriting samples to a handwriting input of the user (e.g., obtained as described in more detail elsewhere herein, such as in connection with FIG. 1A). For example, the handwriting analysis model may compare parameters of the handwriting, such as strokes, slants, size, angle of the handwriting, pressure (e.g., aspects of the handwriting that are indicative of an amount of pressure applied when writing), baseline (e.g., an imaginary line at which most letters or characters sit), and/or shapes (e.g., of letters or other characters), among other examples. As shown by reference number 175, the authentication device may obtain, from the handwriting analysis model, an indication of whether the one or more handwriting samples are authentic. For example, the authentication device may obtain, from the handwriting analysis model, the confidence score that indicates a likelihood that the one or more handwriting samples are in the handwriting of the user associated with the account.

As shown by reference number 180, the authentication device may authenticate the event based on whether the one or more handwriting samples are authentic (e.g., are in the handwriting of the user associated with the account). For example, the authentication device may determine whether the confidence score satisfies a threshold. If the confidence score satisfies the threshold, then the authentication device may determine that the one or more handwriting samples are in the handwriting of the user associated with the account. If the confidence score does not satisfy the threshold, then the authentication device may determine that the one or more handwriting samples are not in the handwriting of the user associated with the account.

If the authentication device determines that the one or more handwriting samples are in the handwriting of the user associated with the account, then the authentication device may perform an action to enable the event to be completed. For example, the authentication device may determine that the user associated with the account has initiated the event. Therefore, the authentication device may enable the event to be performed or completed. If the authentication device determines that the one or more handwriting samples are not in the handwriting of the user associated with the account, then the authentication device may perform an action to prevent the event to be completed. For example, if the authentication device determines that the one or more handwriting samples are not in the handwriting of the user associated with the account, then the authentication device may determine that someone other than the user associated with the account initiated the event. Therefore, the authentication device may stop or prevent the event from being completed to improve the security of the account.

In some implementations, the authentication device may modify a fraud score associated with the event based on whether the one or more handwriting samples are in the handwriting of the user associated with the account. For example, the authentication device may modify a fraud score indicating a likelihood that the event is associated with fraud based on whether the one or more handwriting samples are associated with the handwriting of the user. For example, if the authentication device determines that the one or more handwriting samples are in the handwriting of the user associated with the account, then the authentication device may modify the fraud score to indicate a lower likelihood of fraud. If the authentication device determines that the one or more handwriting samples are not in the handwriting of the user associated with the account, then the authentication device may modify the fraud score to indicate a higher likelihood of fraud. In other words, the handwriting analysis may be one input (e.g., of multiple inputs) to a fraud determination associated with the event. The authentication device may determine whether to enable or prevent the event based on the fraud score (e.g., based on whether the fraud score satisfies a threshold).

As shown by reference number 185, the authentication device may provide, and the terminal device may obtain, an indication to enable or prevent the event from occurring (e.g., based on the determination made by the authentication device, as described above). As an example, if the event is associated with a transaction, then the indication may be to approve the transaction if the one or more handwriting samples are associated with the handwriting of the user. Alternatively, the indication may be to not approve (e.g., decline or deny) the transaction if the one or more handwriting samples are not associated with the handwriting of the user. The terminal device may perform an action to enable or prevent the event from being completed in response to the indication of whether the event is approved or denied from the authentication device.

In some implementations, the authentication device may obtain a user input indicating whether the event was correctly enabled or prevented. For example, the authentication device may obtain the user input from the user device, the terminal device, and/or another device. The user input may indicate whether the event was correctly allowed to occur or prevented from occurring. The authentication device may provide, to the handwriting analysis model, an indication of the one or more handwriting samples and the user input as feedback associated with training the handwriting analysis model to recognize the handwriting of the user. In other words, the user input of whether the event was correctly enabled or prevented may be used as feedback to improve a performance of the handwriting analysis model. For example, the user input indicating whether the event was correctly enabled or prevented may be provided as part of a feedback loop for the handwriting analysis model. The feedback loop may enable the handwriting analysis model to continuously improve over time (e.g., to learn and improve from the mistakes of the handwriting analysis model), to adapt to changes in data and/or the environment, and/or to improve an accuracy of the output of the handwriting analysis model, among other examples.

As indicated above, FIGS. 1A-1C are provided as an example. Other examples may differ from what is described with regard to FIGS. 1A-1C.

Figure 2:
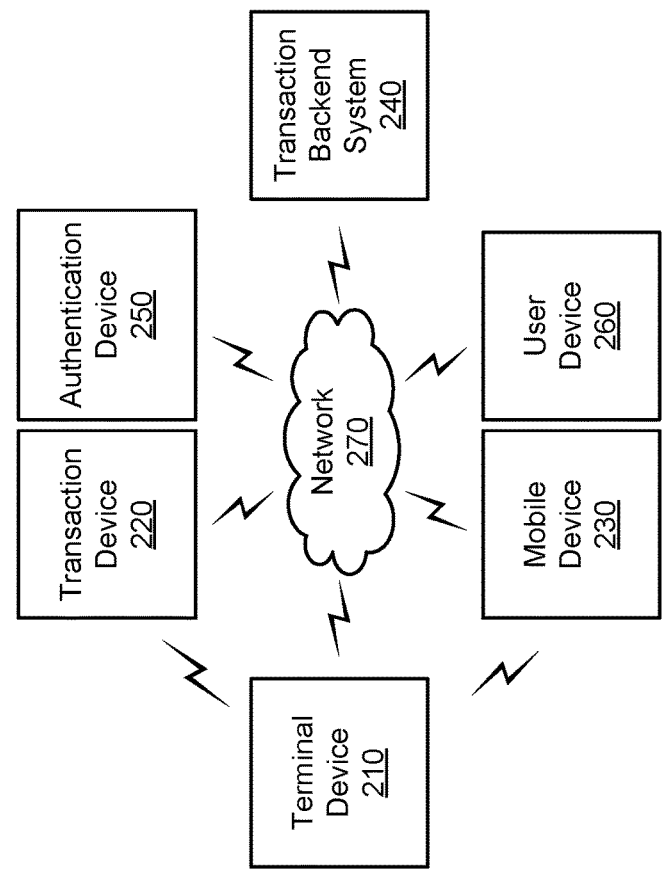
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a terminal device 210, a transaction device 220, a mobile device 230, a transaction backend system 240, an authentication device 250, a user device 260, and a network 270. Devices of environment 200 may interconnect via wired connections and/or wireless connections.

The terminal device 210 may include one or more devices capable of facilitating an electronic transaction associated with the transaction device 220. For example, the terminal device 210 may include a point-of-sale (POS) terminal, a payment terminal (e.g., a credit card terminal, a contactless payment terminal, a mobile credit card reader, or a chip reader), and/or an automated teller machine (ATM). The terminal device 210 may include one or more input components and/or one or more output components to facilitate obtaining data (e.g., account information) from the transaction device 220 and/or to facilitate interaction with and/or authorization from an owner or account holder of the transaction device 220. Example input components of the terminal device 210 include a number keypad, a touchscreen, a magnetic stripe reader, a chip reader, and/or a radio frequency (RF) signal reader (e.g., a near-field communication (NFC) reader). Example output devices of terminal device 210 include a display and/or a speaker.

The transaction device 220 may include one or more devices capable of being used for an electronic transaction. In some implementations, the transaction device 220 may include a transaction card (or another physical medium with integrated circuitry) capable of storing and communicating account information, such as a credit card, a debit card, a gift card, an ATM card, a transit card, a fare card, and/or an access card. In some implementations, the transaction device 220 may be the mobile device 230 or may be integrated into the mobile device 230. For example, the mobile device 230 may execute an electronic payment application capable of performing functions of the transaction device 220 described herein. Thus, one or more operations described herein as being performed by the transaction device 220 may be performed by a transaction card, the mobile device 230, or a combination thereof.

The transaction device 220 may store account information associated with the transaction device 220, which may be used in connection with an electronic transaction facilitated by the terminal device 210. The account information may include, for example, an account identifier that identifies an account (e.g., a bank account or a credit account) associated with the transaction device 220 (e.g., an account number, a card number, a bank routing number, and/or a bank identifier), a cardholder identifier (e.g., identifying a name of a person, business, or entity associated with the account or the transaction device 220), expiration information (e.g., identifying an expiration month and/or an expiration year associated with the transaction device 220), and/or a credential (e.g., a payment token). In some implementations, the transaction device 220 may store the account information in tamper-resistant memory of the transaction device 220, such as in a secure element. As part of performing an electronic transaction, the transaction device 220 may transmit the account information to the terminal device 210 using a communication component, such as a magnetic stripe, an integrated circuit (IC) chip (e.g., a EUROPAY®, MASTERCARD®, VISA® (EMV) chip), and/or a contactless communication component (e.g., an NFC component, an RF component, a Bluetooth component, and/or a Bluetooth Low Energy (BLE) component). Thus, the transaction device 220 and the terminal device 210 may communicate with one another by coming into contact with one another (e.g., using a magnetic stripe or an EMV chip) or via contactless communication (e.g., using NFC).

The mobile device 230 may include one or more devices capable of being used for an electronic transaction, as described above in connection with the transaction device 220. The mobile device 230 may include a communication device and/or a computing device. For example, the mobile device 230 may include a wireless communication device, a mobile phone, a user equipment, a tablet computer, a wearable communication device (e.g., a smart wristwatch, a pair of smart eyeglasses, a head mounted display, or a virtual reality headset), or a similar type of device.

The transaction backend system 240 may include one or more devices capable of processing, authorizing, and/or facilitating a transaction. For example, the transaction backend system 240 may include one or more servers and/or computing hardware (e.g., in a cloud computing environment or separate from a cloud computing environment) configured to receive and/or store information associated with processing an electronic transaction. The transaction backend system 240 may process a transaction, such as to approve (e.g., permit, authorize, or the like) or decline (e.g., reject, deny, or the like) the transaction and/or to complete the transaction if the transaction is approved. The transaction backend system 240 may process the transaction based on information received from the terminal device 210, such as transaction data (e.g., information that identifies a transaction amount, a merchant, a time of a transaction, a location of the transaction, or the like), account information communicated to the terminal device 210 by the transaction device 220, and/or information stored by the transaction backend system 240 (e.g., for fraud detection).

The transaction backend system 240 may be associated with a financial institution (e.g., a bank, a lender, a credit card company, or a credit union) and/or may be associated with a transaction card association that authorizes a transaction and/or facilitates a transfer of funds. For example, the transaction backend system 240 may be associated with an issuing bank associated with the transaction device 220, an acquiring bank (or merchant bank) associated with the merchant and/or the terminal device 210, and/or a transaction card association (e.g., VISA® or MASTERCARD®) associated with the transaction device 220. Based on receiving information associated with the transaction device 220 from the terminal device 210, one or more devices of the transaction backend system 240 may communicate to authorize a transaction and/or to transfer funds from an account associated with the transaction device 220 to an account of an entity (e.g., a merchant) associated with the terminal device 210.

The authentication device 250 may include one or more devices capable of receiving, generating, storing, processing, providing, and/or routing information associated with performing account authentication using handwriting samples, as described elsewhere herein. The authentication device 250 may include a communication device and/or a computing device. For example, the authentication device 250 may include a server, such as an application server, a client server, a web server, a database server, a host server, a proxy server, a virtual server (e.g., executing on computing hardware), or a server in a cloud computing system. In some implementations, the authentication device 250 may include computing hardware used in a cloud computing environment. In some implementations, the authentication device 250 may be included in, or associated with, the transaction backend system 240. For example, the authentication device 250 may be a component of the transaction backend system 240.

The user device 260 may include one or more devices capable of receiving, generating, storing, processing, and/or providing information associated with account authentication using handwriting samples, as described elsewhere herein. The user device 260 may include a communication device and/or a computing device. For example, the user device 260 may include a wireless communication device, a mobile phone, a user equipment, a laptop computer, a tablet computer, a desktop computer, a gaming console, a wearable communication device (e.g., a smart wristwatch, a pair of smart eyeglasses, a head mounted display, or a virtual reality headset), or a similar type of device.

The network 270 may include one or more wired and/or wireless networks. For example, the network 270 may include a cellular network, a public land mobile network, a local area network, a wide area network, a metropolitan area network, a telephone network, a private network, the Internet, and/or a combination of these or other types of networks. The network 270 enables communication among the devices of environment 200. In some implementations, the terminal device 210 may communicate with the transaction device 220 using a first network (e.g., a contactless network or by coming into contact with the transaction device 220) and may communicate with the transaction backend system 240 using a second network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
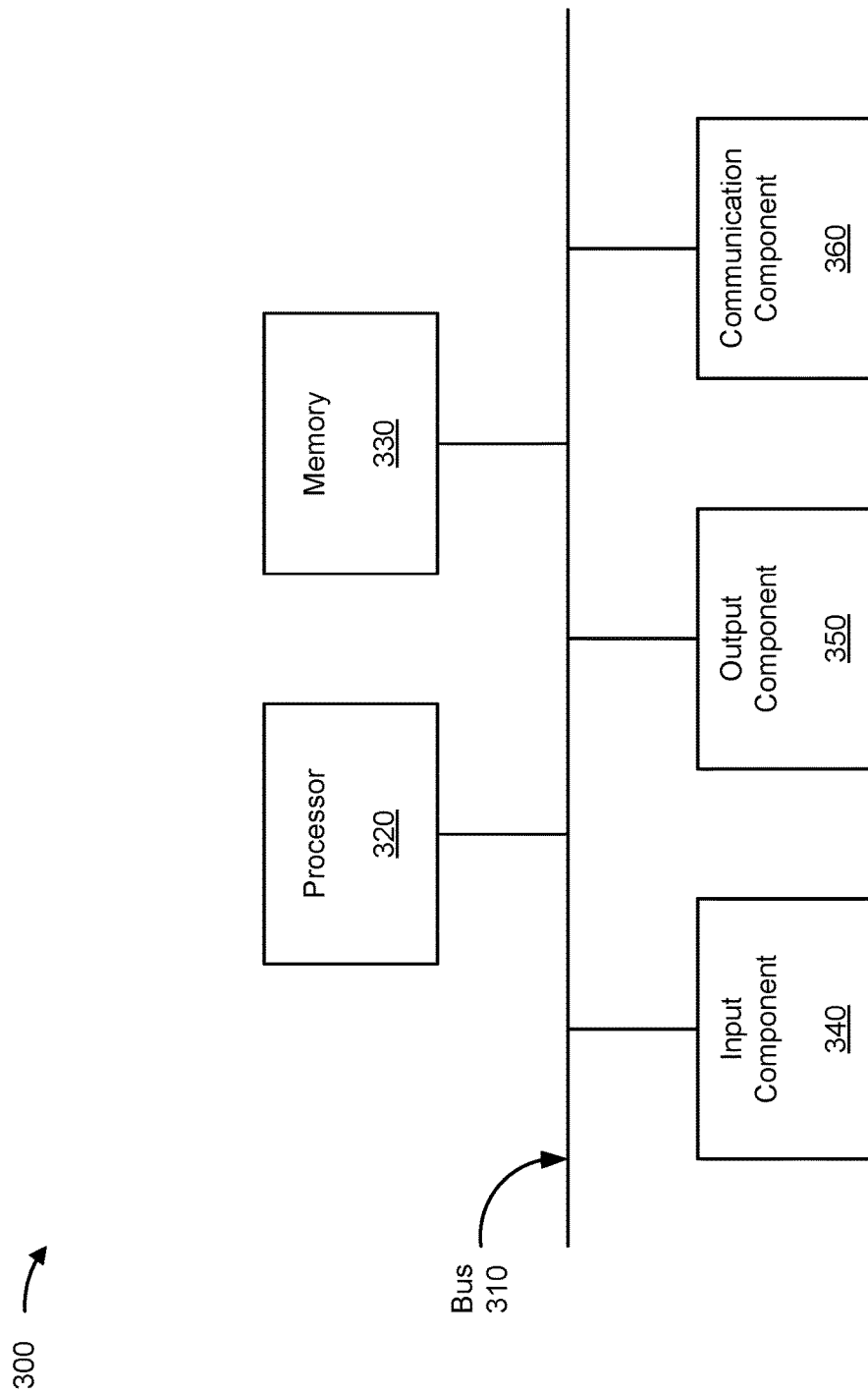
FIG. 3 is a diagram of example components of a device associated with account authentication using handwriting samples, in accordance with some embodiments of the present disclosure.

FIG. 3 is a diagram of example components of a device 300 associated with account authentication using handwriting samples. The device 300 may correspond to the terminal device 210, the transaction device 220, the mobile device 230, the transaction backend system 240, the authentication device 250, and/or the user device 260. In some implementations, the terminal device 210, the transaction device 220, the mobile device 230, the transaction backend system 240, the authentication device 250, and/or the user device 260 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor

320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
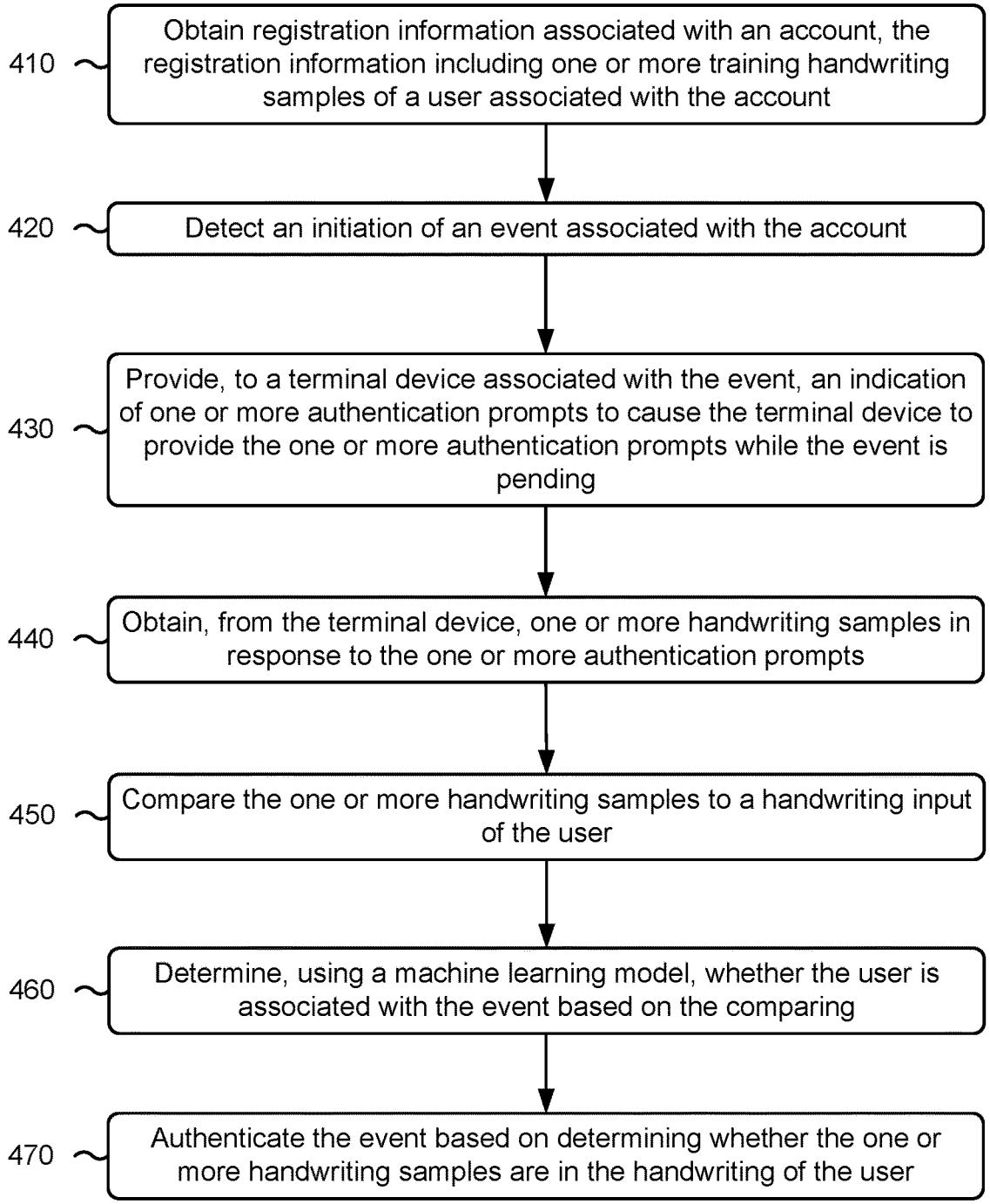
FIG. 4 is a flowchart of an example process associated with account authentication using handwriting samples, in accordance with some embodiments of the present disclosure.

FIG. 4 is a flowchart of an example process 400 associated with account authentication using handwriting samples. In some implementations, one or more process blocks of FIG. 4 may be performed by the authentication device 250. In some implementations, one or more process blocks of FIG. 4 may be performed by another device or a group of devices separate from or including the authentication device 250, such as the terminal device 210, the transaction device 220, the mobile device 230, the transaction backend system 240, and/or the user device 260. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining registration information associated with an account, the registration information including one or more training handwriting samples of a user associated with the account (block 410). For example, the authentication device 250 (e.g., using processor 320 and/or memory 330) may obtain registration information associated with an account, the registration information including one or more training handwriting samples of a user associated with the account, as described above in connection with reference number 110 of FIG. 1A. As an example, the registration information may be associated with establishing the account, modifying the account, and/or enrolling the account in handwriting-based authentication, among other examples.

As further shown in FIG. 4, process 400 may include detecting an initiation of an event associated with the account (block 420). For example, the authentication device 250 (e.g., using processor 320 and/or memory 330) may detect an initiation of an event associated with the account, as described above in connection with reference numbers 130 and/or 135 of FIG. 1B. As an example, the event may be an interaction associated with the account. For example, the event may be a transaction associated with the account.

As further shown in FIG. 4, process 400 may include providing, to a terminal device associated with the event, an indication of one or more authentication prompts to cause the terminal device to provide the one or more authentication prompts while the event is pending (block 430). For example, the authentication device 250 (e.g., using processor 320 and/or memory 330) may provide, to a terminal device associated with the event, an indication of one or more authentication prompts to cause the terminal device to provide the one or more authentication prompts while the event is pending, as described above in connection with reference number 145 of FIG. 1B. In some implementations, the one or more authentication prompts are randomly selected. As an example, the one or more authentication prompts may be one or more words, phrases, shapes, numbers, punctuation, and/or objects, among other examples, that are to be reproduced by a person who initiated the event, in the handwriting of the user, while the event is pending.

As further shown in FIG. 4, process 400 may include obtaining, from the terminal device, one or more handwriting samples in response to the one or more authentication prompts (block 440). For example, the authentication device 250 (e.g., using processor 320 and/or memory 330) may obtain, from the terminal device, one or more handwriting samples in response to the one or more authentication prompts, as described above in connection with reference number 160 of FIG. 1C. As an example, the authentication device 250 may obtain one or more images or other data indicating the one or more handwriting samples. The one or more handwriting samples may be handwritten responses to the one or more authentication prompts.

As further shown in FIG. 4, process 400 may include comparing the one or more handwriting samples to a handwriting input of the user (block 450). For example, the authentication device 250 (e.g., using processor 320 and/or memory 330) may compare the one or more handwriting samples to a handwriting input of the user, as described above in connection with reference numbers 165, 170, 175, and/or 180 of FIG. 1C. As an example, the handwriting input may be obtained in a similar manner as described in connection with reference number 105 of FIG. 1A. The authentication device 250 may compare an obtained handwriting input of the user (e.g., an authenticated handwriting input of the user) to the one or more handwriting samples, such as via a machine learning model.

As further shown in FIG. 4, process 400 may include determining, using a machine learning model, whether the user is associated with the event based on the comparing (block 460). For example, the authentication device 250 (e.g., using processor 320 and/or memory 330) may determine, using a machine learning model, whether the user is associated with the event based on the comparing, as described above in connection with reference number 180 of FIG. 1C. As an example, the authentication device may determine whether a confidence score, output by the machine learning model (e.g., the handwriting analysis model) satisfies a threshold. The confidence score may indicate a likelihood that the one or more handwriting samples are in the handwriting of the user associated with the account.

As further shown in FIG. 4, process 400 may include authenticating the event based on determining whether the one or more handwriting samples are in the handwriting of the user (block 470). For example, the authentication device 250 (e.g., using processor 320 and/or memory 330) may authenticate the event based on determining whether the one or more handwriting samples are in the handwriting of the user, as described above in connection with reference number 185 of FIG. 1C. As an example, if the event is a transaction, then the authentication device 250 may approve or allow the transaction to occur if the one or more handwriting samples are determined to be in the handwriting of the user. Alternatively, the authentication device 250 may not approve or decline the transaction to occur if the one or more handwriting samples are determined to not be in the handwriting of the user.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

Figure 5:
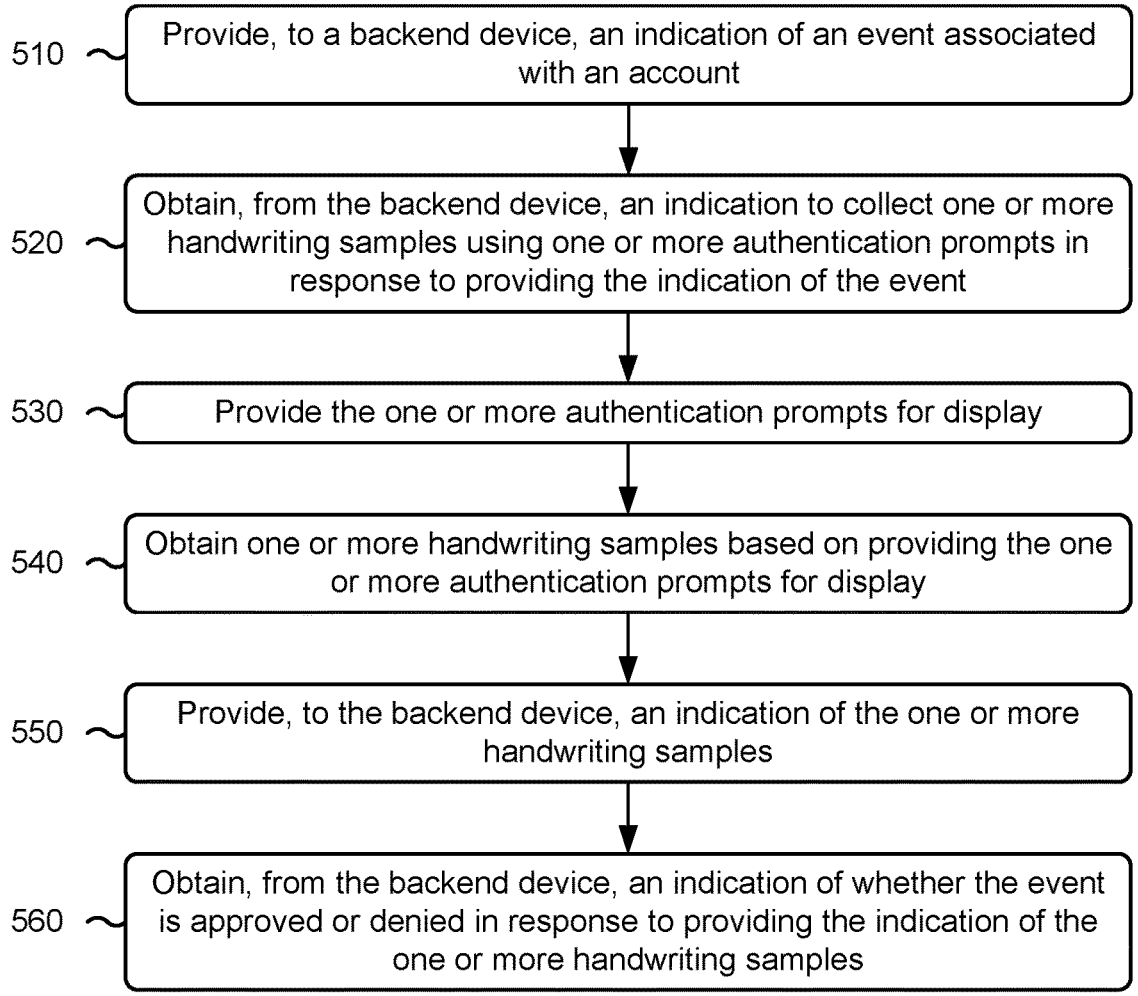
FIG. 5 is a flowchart of an example process associated with account authentication using handwriting samples, in accordance with some embodiments of the present disclosure.

FIG. 5 is a flowchart of an example process 500 associated with account authentication using handwriting samples. In some implementations, one or more process blocks of FIG. 5 may be performed by the terminal device 210. In some implementations, one or more process blocks of FIG. 5 may be performed by another device or a group of devices separate from or including the terminal device 210, such as the transaction device 220, the mobile device 230, the transaction backend system 240, the authentication device 250, and/or the user device 260. Additionally, or alternatively, one or more process blocks of FIG. 5 may be performed by one or more components of the device 300, such as processor 320, memory 330, input component 340, output component 350, and/or communication component 360.

As shown in FIG. 5, process 500 may include providing, to a backend device, an indication of an event associated with an account (block 510). For example, the terminal device 210 (e.g., using processor 320 and/or memory 330) may provide, to a backend device, an indication of an event associated with an account, as described above in connection with reference number 130 of FIG. 1B. As an example, the backend device may be the authentication device 250, and the event may be a transaction associated with an account.

As further shown in FIG. 5, process 500 may include obtaining, from the backend device, an indication to collect one or more handwriting samples using one or more authentication prompts in response to providing the indication of the event (block 520). For example, the terminal device 210 (e.g., using processor 320 and/or memory 330) may obtain, from the backend device, an indication to collect one or more handwriting samples using one or more authentication prompts in response to providing the indication of the event, as described above in connection with reference number 145 of FIG. 1B. As an example, the terminal device 210 may obtain an indication to display the one or more authentication prompts to cause a person who initiated the event (e.g., via the terminal device 210) to input handwritten responses to the one or more authentication prompts while the event is pending.

As further shown in FIG. 5, process 500 may include providing the one or more authentication prompts for display (block 530). For example, the terminal device 210 (e.g., using processor 320 and/or memory 330) may provide the one or more authentication prompts for display, as described above in connection with reference number 150 of FIG. 1C. As an example, the terminal device 210 may display the one or more authentication prompts via a display screen and/or a capture pad of the terminal device 210.

As further shown in FIG. 5, process 500 may include obtaining one or more handwriting samples based on providing the one or more authentication prompts for display (block 540). For example, the terminal device 210 (e.g., using processor 320 and/or memory 330) may obtain one or more handwriting samples based on providing the one or more authentication prompts for display, as described above in connection with reference number 155 of FIG. 1C. As an example, the terminal device 210 may obtain or capture one or more images or other data indicating the one or more handwriting samples. The one or more handwriting samples may be handwritten responses to the one or more authentication prompts.

As further shown in FIG. 5, process 500 may include providing, to the backend device, an indication of the one or more handwriting samples (block 550). For example, the terminal device 210 (e.g., using processor 320 and/or memory 330) may provide, to the backend device, an indication of the one or more handwriting samples, as described above in connection with reference number 160 of FIG. 1C. As an example, the terminal device 210 may provide one or more images or other data indicating the one or more handwriting samples.

As further shown in FIG. 5, process 500 may include obtaining, from the backend device, an indication of whether the event is approved or denied in response to providing the indication of the one or more handwriting samples (block 560). For example, the terminal device 210 (e.g., using processor 320 and/or memory 330) may obtain, from the backend device, an indication of whether the event is approved or denied in response to providing the indication of the one or more handwriting samples, as described above in connection with reference number 185 of FIG. 1C. As an example, if the event is a transaction, then the terminal device 210 may obtain approval or allowance for the transaction to occur if the one or more handwriting samples are determined to be in the handwriting of the user. Alternatively, the terminal device 210 may obtain an indication to not approve or to decline the transaction to occur if the one or more handwriting samples are determined to not be in the handwriting of the user. In some implementations, the terminal device 210 may perform an action to enable or prevent the event based on the indication of whether the event is approved or denied.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1C. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a–b, a–c, b–c, and a–b–c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a–b, a–c, b–c, and a–b–c.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and/or measuring, among other examples. Also, "determining" can include receiving (such as receiving information), accessing (such as accessing data stored in memory), and/or transmitting (such as transmitting information), among other examples. Also, "determining" can include resolving, selecting, obtaining, choosing, establishing and other such similar actions.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information. Also, as used herein, the term "or" is intended to be inclusive when used in a series and may be used interchangeably with "and/or," unless explicitly stated otherwise (e.g., if used in combination with "either" or "only one of").

What is claimed is:

1. A system for account authentication using handwriting samples, the system comprising:
   one or more memories; and
   one or more processors, communicatively coupled to the one or more memories, configured to:
   obtain registration information associated with an account, the registration information including one or more training handwriting samples of a user associated with the account,
   wherein the one or more training handwriting samples are associated with training a machine learning model to recognize a handwriting input of the user;
   detect an initiation of an event associated with the account and a terminal device;
   generate, in response to detecting the initiation of the event, a random sequence of one or more authentication prompts associated with authenticating that the user is associated with the event;
   provide, to the terminal device and in response to detecting the initiation of the event, an indication of the one or more authentication prompts to cause the terminal device to provide the one or more authentication prompts in connection with performing the event;
   obtain, from the terminal device, one or more handwriting samples corresponding to the one or more authentication prompts;

determine, using the machine learning model, whether the user is associated with the event based on verifying that the one or more handwriting samples are associated with the handwriting input of the user; and perform an action associated with enabling or preventing a completion of the event based on whether the user is associated with the event.

2. The system of claim 1, wherein the one or more processors are further configured to:
determine, based on one or more parameters associated with the event, a fraud score indicating a likelihood that the event is associated with fraud, and
wherein the one or more processors, to provide the indication of the one or more authentication prompts, are configured to:
provide the indication of the one or more authentication prompts in response to the fraud score satisfying a fraud threshold.

3. The system of claim 1, wherein the event is a transaction associated with the account, and wherein the one or more processors, to perform the action associated with enabling or preventing the event from occurring, are configured to:
approve the transaction if the one or more handwriting samples are associated with the handwriting input of the user; or
not approve the transaction if the one or more handwriting samples are not associated with the handwriting input of the user.

4. The system of claim 1, wherein the one or more processors, to perform the action associated with enabling or preventing the event from occurring, are configured to:
modify a fraud score indicating a likelihood that the event is associated with fraud based on whether the one or more handwriting samples are associated with the handwriting input of the user.

5. The system of claim 1, wherein the one or more processors, to obtain the one or more handwriting samples corresponding to the one or more authentication prompts, are configured to:
obtain a captured image of a receipt associated with the event, the captured image of the receipt depicting the one or more handwriting samples.

6. The system of claim 1, wherein the one or more processors, to generate the random sequence of the one or more authentication prompts, are configured to:
generate the one or more authentication prompts based on a level of complexity of the one or more authentication prompts satisfying a complexity threshold.

7. The system of claim 1, wherein the one or more processors are further configured to:
obtain a user input indicating whether the event was correctly enabled or prevented; and
provide, to the machine learning model, an indication of the one or more handwriting samples and the user input as feedback associated with training the machine learning model to recognize the handwriting input of the user.

8. The system of claim 1, wherein the event includes at least one of:
an access attempt associated with the account,
a password change associated with the account,
a test to determine whether the event is initiated by a human, or
a withdrawal request associated with the account.

9. A method of account authentication using handwriting samples, comprising:
obtaining, by a device, registration information associated with an account, the registration information including one or more training handwriting samples of a user associated with the account,
detecting, by the device, an initiation of an event associated with the account;
providing, by the device and to a terminal device associated with the event, an indication of one or more authentication prompts to cause the terminal device to provide the one or more authentication prompts while the event is pending,
wherein the one or more authentication prompts are randomly selected;
obtaining, by the device and from the terminal device, one or more handwriting samples in response to the one or more authentication prompts;
comparing, by the device, the one or more handwriting samples to a handwriting input of the user;
determining, by the device and using a machine learning model, whether the user is associated with the event based on the comparing; and
authenticating, by the device, the event based on determining whether the one or more handwriting samples are in handwriting of the user.

10. The method of claim 9, further comprising:
training, using the one or more training handwriting samples, the machine learning model to recognize the handwriting of the user.

11. The method of claim 9, wherein the one or more handwriting samples are handwritten responses to the one or more authentication prompts.

12. The method of claim 9, wherein obtaining the registration information is associated with at least one of:
registering or establishing the account, or
enrolling the account for handwriting-based authentication.

13. The method of claim 9, further comprising:
generating the one or more authentication prompts based on a level of complexity of the one or more authentication prompts.

14. The method of claim 9, wherein detecting the initiation of the event comprises:
detecting that a fraud score, associated with an interaction with the account, satisfies a fraud threshold.

15. The method of claim 9, wherein authenticating the event comprises:
determining whether to enable or prevent a completion of the event based on determining whether the one or more handwriting samples are in the handwriting of the user.

16. A non-transitory computer-readable medium storing a set of instructions, the set of instructions comprising:
one or more instructions that, when executed by one or more processors of a device, cause the device to:
provide, to a backend device, an indication of an event associated with an account;
obtain, from the backend device, an indication to collect one or more handwriting samples using one or more authentication prompts in response to providing the indication of the event;
provide the one or more authentication prompts for display;
obtain one or more handwriting samples based on providing the one or more authentication prompts for display;

provide, to the backend device, an indication of the one or more handwriting samples; and obtain, from the backend device, an indication of whether the event is approved or denied in response to providing the indication of the one or more handwriting samples.

17. The non-transitory computer-readable medium of claim 16, wherein the event is associated with a transaction, and wherein the one or more instructions, that cause the device to provide the one or more authentication prompts for display, cause the device to:

display the one or more authentication prompts via a display; and wherein the one or more instructions, that cause the device to obtain the one or more handwriting samples, cause the device to:

obtain the one or more handwriting samples via a user input to the display.

18. The non-transitory computer-readable medium of claim 16, wherein the one or more instructions, that cause the device to provide the one or more authentication prompts for display, cause the device to:

cause a physical receipt to be printed that includes the one or more authentication prompts.

19. The non-transitory computer-readable medium of claim 16, wherein the one or more instructions, when executed by the one or more processors, further cause the device to:

perform an action associated with the event in response to obtaining the indication of whether the event is approved or denied.

20. The non-transitory computer-readable medium of claim 16, wherein the one or more authentication prompts are randomly selected prompts.

* * * * *